United States Patent Office 3,419,227
Patented Dec. 31, 1968

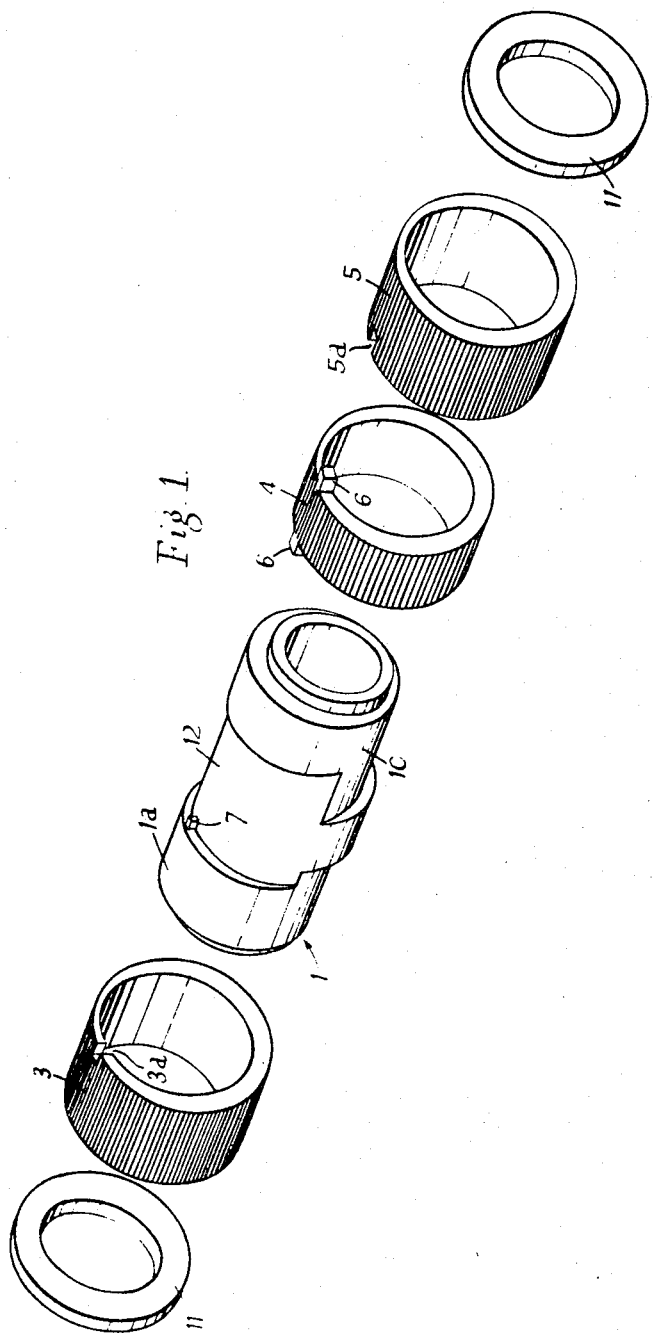

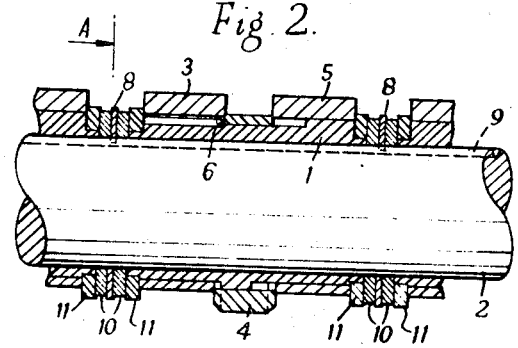
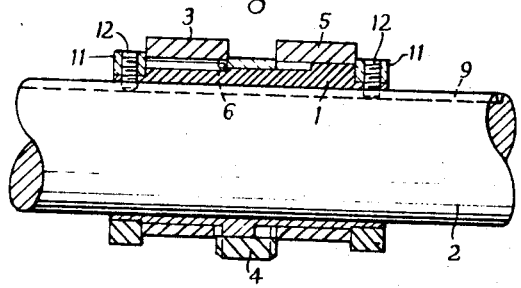
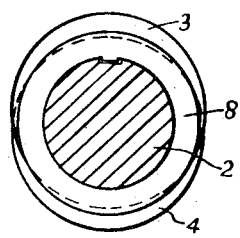

3,419,227
DEVICE FOR LOCKING A HOLLOW CORE TO A DRIVE SHAFT
Gottfried W. L. Werkmeister, 64 Drax Ave., London SW. 20, England, and Reginald J. McCarthy, 20 Poole Road, London E. 9, England
Filed Dec. 20, 1966, Ser. No. 603,280
3 Claims. (Cl. 242—72)

ABSTRACT OF THE DISCLOSURE

A device for locking a hollow core to a drive shaft comprising axially aligned rings which can turn on eccentrics adapted to be connected to said drive shaft, said rings when turned in one direction moving radially into driving engagement with the inside of a hollow core supported thereon, and when turned in an opposite direction moving inwardly radially towards a concentric core-release position.

---

This invention relates to a device for releasably locking a hollow core to a drive shaft, and is intended more particularly, but not exclusively, for use with machinery in which strip or web material is wound on to, or unwound from, a core, for example as may be used in the converting, printing and packaging trades and in particular on slitting and rewind machinery.

The present invention is concerned with a device which, when rotated, expands to grip against the inside of a surrounding core and by contrarotating it contracts and readily releases its grip on the core. Its application, in particular, to slitting and rewind machinery is that it provides an efficient locking and drive device for cores on rewind shafts, such that the self-locking cores can be easily loaded and unloaded on to the drive shaft without upsetting any set programme. This applies to single and multispindle rewind shafts with a direct or friction disc drive to a main drive shaft.

In particular the invention is concerned with a device for the purpose referred to which comprises an inner eccentric cylindrical body part adapted to be mounted on and driven by a shaft, and on which is mounted two or more (preferably three) outer eccentric rings which are interconnected so that they can be turned in unison from a core release position, when the eccentric rings are concentric with the axis of the bore of said body part and therefore that of a shaft on which the body part is mounted, to a core-gripping position in which the eccentric rings are displaced outwardly radially and so expanded into driving contact with the inner face of the core.

The primary object of the present invention is the provision of a device adapted to operate in the manner described in the foregoing paragraph, but which incorporates means which prevents overrun of the eccentric rings when they are moved into a core releasing position, thereby enabling an operator positively to locate the eccentrics in a neutral position for unloading of the core in which they are concentric with the axis of the shaft on which the body part is mounted.

A further object of the invention is to ensure accurate alignment and concentricity of a core on a shaft on which it is fitted.

According to this invention there is provided a device for the purpose referred to which comprises an inner eccentric cylindrical body part adapted to be mounted on and driven by a shaft, two or more (preferably three) outer eccentric rings interconnected to turn and expand and contract in unison between core-gripping and core-release positions, and which is characterised in that the eccentric cylindrical body part is provided with means which prevents further turning movement and overrun of the eccentrics when they assume a core-releasing position in which they are concentric with the axis of the shaft on which said body part is mounted.

To enable the invention to be clearly understood a preferred embodiment thereof will now be described by way of example, with reference to the drawings accompanying our provisional specification and wherein:

FIGURE 1 is an exploded perspective view of the parts constituting the core locking device of this invention.

FIGURE 2 is a view in section showing said parts assembled.

FIGURE 3 is a transverse cross-section taken on the line A—A of FIGURE 2, and

FIGURE 4 is a view similar to FIGURE 2, but illustrating an alternative manner in which the device is drivingly connected to a shaft.

Referring to said drawings, the device comprises an inner eccentric cylindrical body part 1 for mounting on a shaft 2, and adapted to be drivingly connected with the latter in a manner as hereinafter described.

Mounted on the eccentric body part 1 are three outer eccentric rings 3, 4 and 5 respectively, which are interconnected so that they can be turned simultaneously or in unison to the expanded position shown in FIGURES 2 to 4, in which they will engage and grip the inner surface of a core (not shown) which has been engaged over them prior to their expansion.

The three eccentric rings 3, 4 and 5 are constrained to turn in unison by forming the centre ring 4 with a pair of integral keys 6 which engage respectively in cutouts 3a and 5a in the rings 3 and 5, the keys 6 sliding radially in the cutouts 3a and 5a as the rings move between their concentric positions and their eccentric positions.

The means for limiting turning movement of the rings after they have reached a neutral core-releasing position in which they are concentric with the axis of the shaft 2, comprises a stop key or pin 7 on the body part 1 which is engaged by one of the keys 6. It will be appreciated that as the centre ring 4 is connected to the rings 3 and 5 by the keys 6, further relative movement of the rings 3 and 5 is also prevented when the key 6 engages the stop key 7.

Conveniently, the stop key or pin 7 is directed axially from a shoulder formed between two adjacent eccentric portions 1a and 1b of the eccentric body part 1. If desired, a second stop pin 7 may be provided on the third eccentric part 1a of said body part.

From the foregoing it will be appreciated that the keys 6 serve a dual purpose in that they serve to interconnect all three eccentric rings and one or both of them constitutes an abutment means which coacts with the stop key or pin 7 to limit an over turning or running of the rings when they are all concentric with the axis of the shaft 1.

FIGURE 2 illustrates one way in which the core locking device may be drivingly connected to the shaft 2 by means of driving ring 8 which engages in a key way 9 in the shaft 2, and is interposed between a pair of slipping discs 10 which engage between end caps 11 of adjacent pairs of devices and which are tight fits on the ends of the body part 1 and retain the eccentric rings against axial displacement.

FIGURE 4 illustrates an alternative form of drive between the shaft 1 and the core locking device, the drive in this case comprising drive pins 12 which extend through the end caps 11 and engage at their inner ends in the key way 9.

If the eccentric rings 3, 4 and 5 are required to lock in an opposite direction then they are rotated through approximately 355° to the opposite side of the stop key or pin 7, when the same limiting movement of the ring is achieved but in an opposite direction, i.e., in a clockwise direction instead of an anticlockwise direction, or vice versa.

We claim:

1. A device for releasably locking a hollow core to a drive shaft comprising in combination, an inner eccentric cylindrical body part mounted on and driven by said shaft, at least three outer eccentric rings mounted on said body, means interconnecting said rings to turn, expand and contract in unison between core-gripping and core-release positions, said interconnecting means comprising aligned key means extending from opposite sides of an intermediate eccentric ring, each of the eccentric rings adjacent said intermediate ring having a cutout in the side of the ring facing the intermediate ring and in which said key means slides radially, means on the eccentric cylindrical body part for preventing further turning movement and overrun of the eccentrics when they assume a core-releasing position in which they are concentric with the axis of the shaft on which said body part is mounted, said last mentioned means comprising a stop pin on the eccentric cylindrical body part which, when said rings are in a concentric core-releasing position, is engaged on one side by one of said key means on said intermediate ring, said rings being movable through substantially 355° in opposite directions from concentric positions to permit torque to be imparted to the device in both clockwise and anticlockwise directions.

2. A device according to claim 1, wherein said drive shaft is provided with a keyway, means connecting said cylindrical body to said drive shaft for rotation therewith, said connecting means comprising, a driving ring engaged in said keyway, a slipping disc disposed on each side of said driving ring, and caps on the ends of adjacent cylindrical bodies which caps engage said slipping discs and retain the eccentric rings against axial displacement.

3. A device according to claim 1, wherein said drive shaft is provided with a keyway, means connecting said cylindrical body to said drive shaft for rotation therewith, said connecting means comprising, caps fitted on opposite ends of said cylindrical body, and drive pins extending through each of said caps and projecting into said keyway.

References Cited

UNITED STATES PATENTS 1,673,444    6/1928    Derry _____ 242—72
3,073,632    1/1963    Grunbaum.

STANLEY N. GILBREATH, *Primary Examiner.*

U.S. Cl. X.R.

242—46.4; 279—6; 287—52.09